Nov. 13, 1956 E. M. CREAMER, JR 2,770,673

SOUND AND COLOR SIGNAL DETECTION SYSTEM

Original Filed Oct. 23, 1952 2 Sheets-Sheet 1

INVENTOR.
EDGAR M. CREAMER, JR.
BY
Allen V. Hazeltine
ATTORNEY

SOUND AND COLOR SIGNAL DETECTION SYSTEM

Original Filed Oct. 23, 1952 2 Sheets-Sheet 2

INVENTOR.
EDGAR M. CREAMER, JR.
BY
Allen V. Hazeltine
ATTORNEY

United States Patent Office 2,770,673

Patented Nov. 13, 1956

2,770,673

SOUND AND COLOR SIGNAL DETECTION SYSTEM

Edgar M. Creamer, Jr., Philadelphia, Pa., assignor to Philco Corporation, Philadelphia, Pa., a corporation of Pennsylvania Continuation of application Serial No. 316,511, October 23, 1952. This application March 8, 1955, Serial No. 492,909

19 Claims. (Cl. 178—5.4)

The present invention relates to television receiving systems, the instant disclosure being a continuation of my copending application, Serial No. 316,511, filed October 23, 1952, now abandoned. More particularly the invention relates to color television receiving systems for receiving and reproducing image information, which is in the form of a video wave modulated on a so-called picture carrier and has a plurality of signal components definitive of the brightness and chromaticity of the image to be reproduced and in which the audio information accompanying the image is in the form of a signal modulated on a so-called sound carrier which accompanies the picture carrier and is spaced frequency-wise from the picture carrier by a fixed predetermined amount.

To produce a video color wave of the foregoing type, there may be derived at the transmitter, by means of appropriate camera units, three signals indicative of three color-specifying parameters of successively scanned elements of a televised scene. Preferably the three color image defining signals are generated in accordance with the principles set forth in the copending application of Frank J. Bingley, Serial No. 225,567, filed May 10, 1951. As described in that application, the image to be televised is resolved into three color signals, one of which is proportional to the energy distribution of the light emitted by the image as weighted by a color mixture curve having a shape and an ordinate scale substantially identical to the shape and ordinate scale of the curve of the relative luminosities of the spectral colors to the eye. The second and third color signals are made proportional respectively to the energy distribution of the light emitted by the image as weighted by second and third color mixture curves having shapes and ordinate scales complementing the shape and ordinate scale of the first curve. The first of these signals accordingly defines the brightness of the image elements and is a signal having a relatively large bandwidth extending, for example, to a value of 3.5 mc./sec., whereas the remaining two signals define, with the first signal, the chromaticity of the image and need only be of a relatively small bandwidth—i. e. of the order of 400 kc./sec. The first signal may be utilized directly to form one component of the color video wave, and the second and third signals, modified by the first signal to produce two difference signals, may then be modulated in phase quadrature on a carrier to produce a modulated wave component arranged at one end of the frequency spectrum of the first signal.

Alternatively the three signals indicative of the three color specifying parameters of the televised scene may be such as to specify the brightness and chromaticity of the image in terms of the primary colors of a specific primary color system. More particularly, a wide band signal approximately proportional to the brightness of a televised scene, hereinafter to be referred to as M, may be generated at the transmitter by combining three signals proportional to specific red, green and blue primary color components of the colors of the successively scanned image elements. Such a signal may have a value determined by $$\frac{R+G+B}{3}$$

where R, G and B represent the intensities of the red, green and blue primary color components of the successively scanned image elements. Two additional narrow band signals N and O, complementary to M and defining with the signal M the color of the image elements, may be generated by appropriately combining the R, G and B signals. In a preferred arrangement at the transmitter, the M, N and O components are combined to form two narrow band difference signals (N—M) and (O—M) which respectively are transmitted in different phase relations as amplitude modulation of a carrier in a manner similar to that above described.

Accordingly, in either of the instances above described, the color video wave comprises a first component of relatively wide bandwidth defining the brightness of the consecutively scanned image elements, and further comprises a second component in the form of a modulated carrier arranged at one end of the frequency spectrum of the first component and defining, with the first component, the chromaticity of the image elements. In a typical case the first component may have a frequency spectrum extending from 0 to 3.5 mc./sec., and the color carrier component may have a frequency at approximately 3.89 mc./sec. For transmission to the receiving position the two image components may then be modulated onto a radio frequency carrier at the desired picture carrier frequency—i. e. at a frequency of 61.25 mc./sec.

The audio intelligence accompanying the televised image may be additionally transmitted in the form of a frequency modulated carrier arranged at one end of the frequency spectrum occupied by the video color wave. In accordance with usual practice, this sound carrier is spaced precisely 4.5 mc./sec. above the picture carrier and, in the typical example above noted, the sound carrier may have a frequency of 65.75 mc./sec.

It thus appears that the transmitted signal defining a color television image and its accompanying sound comprises a picture carrier having a first group of sideband components as determined by a first image component and extending to a frequency of approximately 3.5 mc./sec. above the frequency of the picture carrier, a second group of sideband components as determined by a second image component and arranged about a central frequency approximately 3.89 mc./sec. above the frequency of the picture carrier, and audio information arranged about a central frequency 4.5 mc./sec. above the frequency of the picture carrier.

The signal arriving at the receiving position has a low level and must be suitably amplified before it can be detected to recover the image and aural information. For this purpose a superheterodyne receiver is generally used, in which case the received signal is converted to an intermediate frequency wave of predetermined frequency value.

Preferably, in order to facilitate the design of the receiver and in order to maintain precisely the difference values between the frequencies of the picture carrier, the color carrier and the sound carrier, it has been the practice to amplify the signal to the desired degree in a common channel and thereafter to apply the signal to a single detector system by means of which the three components of the signal may be recovered and separated for use in producing the image and sound. It has been found, however, that the detection systems heretofore used for so recovering the image and sound components generate additionally undesired components which adversely affect the desired signals to the detriment of the image to be reproduced. More particularly it has been found that, when the above described signal is supplied to a detection system of the type heretofore used, the output wave of the detector contains not only the desired three components above described, but also contains spurious signals representing beat frequencies between the component defining the chromaticity of the image and the component defining the audio information. In a typical case, in which the received signal is converted into an I. F. signal so that the picture carrier supplied to the detection system has a frequency of 45.75 mc./sec., the color carrier has a frequency of approximately 41.86 mc./sec. and the sound carrier has a frequency of 41.25 mc./sec., a pronounced spurious signal is produced at a frequency of the order of 600 kc./sec. representing the beat frequency between the color and the sound carriers. This spurious signal falls well within the 0 to 3.5 mc./sec. spectrum range of the brightness component of the image signal and produces an annoying beat or herringbone pattern in the reproduced image.

It has been proposed to reduce the intensity of this undesired beat signal by attenuating the color and sound carriers applied to the detector to a level sufficiently low so that the effects produced are barely discernible under normal viewing and operating conditions. However, this expedient has not proved satisfactory because it is then necessary to amplify individually the detected color carrier at 3.89 mc./sec. and the sound carrier component at 4.5 mc./sec. to a usable level, thereby increasing the cost of the receiver. Furthermore, in the case of the detected color carrier, the amount of amplification so provided must be carefully controlled in order to restore the amplitude ratio initially established at the transmitter between the chromaticity information, as contained in the color carrier, and the brightness information as contained in the brightness component of the image signal. In addition, in order to achieve the desired attenuation of the color and sound carriers and to provide good reproduction of picture detail, color and sound, it is necessary to tune precisely the local oscillator used to convert the received signal into an I. F. signal so that the resulting color and sound I. F. carrier frequencies will be properly aligned with reference to I. F. trap circuits and the I. F. amplifier response characteristics.

It is an object of the invention to provide a novel receiving system for processing a color television signal.

A further object of the invention is to provide a receiving system, for a color television signal, in which spurious signals normally brought about by interaction of the components of the received signal are avoided.

Another object of the invention is to provide a novel receiving system, for supplying energizing signals to a color television image reproducer, which is simple, reliable and of low cost, and which inherently provides a balanced relationship between the signal components establishing the color image to be reproduced.

Further objects of the invention will appear as the specification progresses.

In accordance with the invention, in a receiving system for a color television signal comprising picture information in the form of a picture carrier modulated by a first component having a relatively wide frequency spectrum and defining one aspect of the image to be reproduced, and by a second component in the form of a modulated carrier arranged at one end of the spectrum of the first component and defining another aspect of the image to be reproduced, and comprising aural information in the form of a modulated carrier having a frequency spaced by a predetermined amount from the frequency of the picture carrier, the foregoing objects are achieved by a novel detection system, by means of which the said first component is detected independently of the color and the sound carrier components, and the two carrier components are detected in common. More specifically, in accordance with the invention, the received signal, preferably after being converted into an intermediate frequency wave, is divided into a first portion, which contains at least the picture carrier and the image brightness information impressed thereon, and a second portion which contains at least the color and sound carrier components. The first of the aforementioned signal portions may also contain the color and sound carrier components but, if so, then at least one of these components should be present only in heavily attenuated form. The first of these portions is supplied to a first detector system to derive therefrom the wideband signal component defining the detail brightness of the image to be reproduced, whereas the second of these portions is applied to a second detection system, which is further energized by the picture carrier wave and by means of which the modulated carriers are simultaneously recovered at their initially generated central frequency values.

The invention will be described in greater detail with reference to the appended drawings forming part of the specification, and in which.

Figure 1:
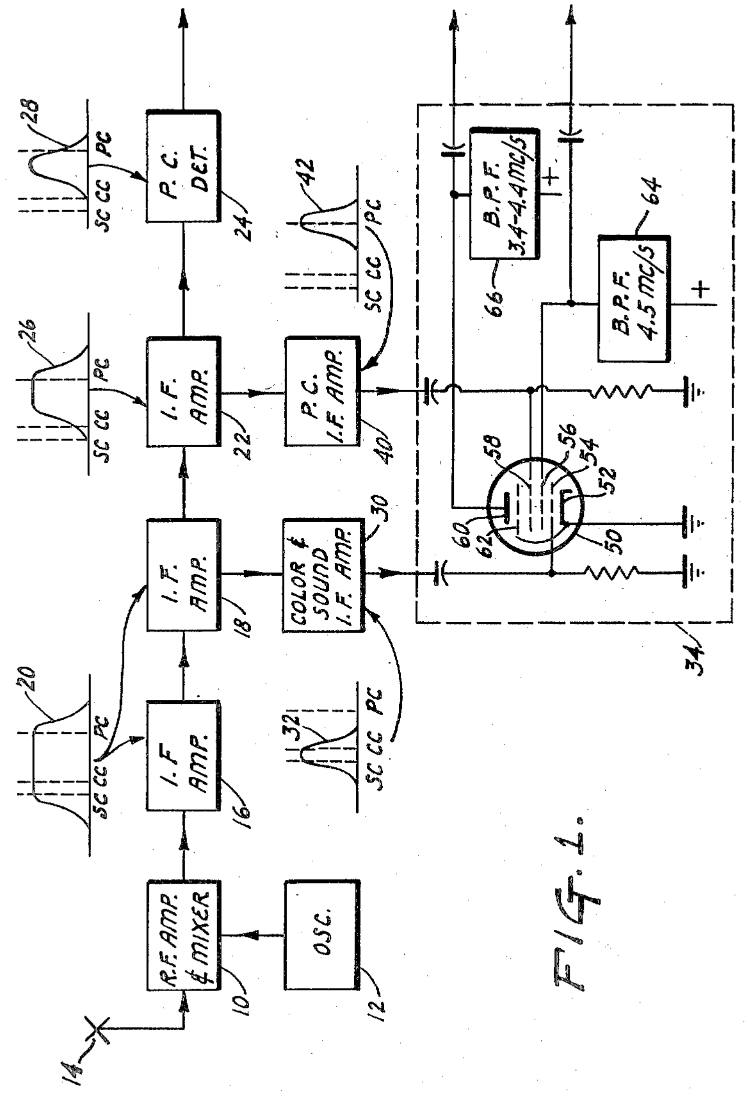
Figure 1 is a block diagram, partly schematic, showing one form of a receiving system in accordance with the invention.

Referring to Figure 1, the color television receiving system specifically shown therein comprises a radio freqeuncy amplifier-mixer 10 and an oscillator 12, both of which may be of conventional design. The amplifier-mixer 10 is coupled to a suitable antenna system 14 for receiving the transmitted signal bearing the desired image and sound information. In a typical case, the transmitted signal may consist of a picture carrier at a frequency of 61.25 mc./sec., and a sound carrier at a freqeuncy of 65.75 mc./sec. As above pointed out, the picture carrier is modulated by a first wideband component defining the brightness of the image element and by a second, relatively narrow band component in the form of a modulated carrier defining, with the first component, the chromaticity of the image elements. This second component may have a frequency differing by approximately 3.89 mc./sec. from the picture carrier, in which case the frequency value thereof in the transmitted signal is approximately 65.14 mc./sec.

The received signal, constituted as above described, is heterodyned in the mixer 10 with a beating signal derived from the oscillator 12 to produce an intermediate frequency signal which is applied to I. F. amplifiers 16 and 18. Amplifiers 16 and 18 may be of conventional form and are characterized by having frequency pass bands which are centered about an I. F. frequency of suitably large value and which are sufficiently wide to accommodate the overall bandwidth of the applied signal. As will be pointed out more fully hereinafter, the receiver system of the invention makes it possible to utilize amplifiers having symmetrical bandpass characteristics, thereby simplifying the design of these amplifiers. Such a symmetrical bandpass characteristic has been shown in the drawing by the curve 20, on which also are indicated the relative positions of the picture carrier PC, the color carrier CC and the sound carrier SC. In a typical case the bandpass characteristics of the amplifiers 16 and 18 may have a common central frequency of the order of 44 mc./sec. and a bandwidth of the order of 6 mc./sec., in which case, when the oscillator 12 is appropriately tuned to a frequency greater than the frequency of the received signal, the picture carrier may be positioned at a frequency of 45.75 mc./sec., the color carrier at approximately 41.86 mc./sec., and the sound carrier at 41.25 mc./sec.

In accordance with the invention, the component of the received signal defining the detail brightness of the image, and the two carrier components defining respectively the chromaticity of the image and the accompanying sound information, are derived respectively from different portions of the receiver system in a manner which precludes contamination of the detail brightness information by spurious signals normally derived from the two carrier components. More specifically, and in the system shown in the drawing, the signal from the I. F. amplifier 18 is supplied through an I. F. amplifier 22 to a picture carrier detector 24, which may consist of the usual diode detector, and which serves to recover the low frequency brightness detail information of the image, contained in the I. F. wave, to the exclusion of the two carrier components of the I. F. wave.

In order to achieve this selective detection of the low frequency component of the image signal, the I. F. amplifier 22 and detector 24 are constructed with a restricted bandwidth so as to attenuate sharply the color carrier and sound carrier. This may be achieved by providing the I. F. amplifier 22 with a bandwidth characteristic as shown by the curve 26, adapted to attenuate the color carrier and the sound carrier, and by providing the detector 24 with a bandwith characteristic as shown by the curve 28 so that the two carriers are further attenuated and preferably the amplitude of the picture carrier is also partially attenuated to one-half its normal value.

By so attenuating the I. F. wave supplied to the detector 24 the output signal produced thereby is free from any contaminating signal normally produced by the color and sound carrier components of the I. F. wave. Furthermore, by attenuating the picture carrier to the one-half value as above described, it is ensured that the waveform distortion normally brought about by the vestigial sidebands of the picture carrier do not manifest themselves in the detected brightness detail signal so that further security from spurious signals in the low frequency component of the image signal is achieved.

The color and sound carrier components of the I. F. signal are separately derived from the I. F. amplifier 18 by means of I. F. amplifier 30 serving as a bandpass filter for the two carrier components. Amplifier 30, which may be of conventional form, is characterized by having a bandpass characteristic sufficiently wide to include the sidebands of the carrier components but such as to attenuate sharply the picture carrier and the brightness detail component. In a typical form, the bandpass characteristic of the I. F. amplifier 30 may have the shape shown by the curve 32. The two carriers so derived from the amplifier 30 are supplied as a first input signal to a heterodyne detector 34 which is also supplied with a signal at the picture carrier frequency.

For supplying a heterodyne detection signal at the picture carrier frequency to the detector 34, there is provided a picture carrier I. F. amplifier 40 having a bandpass characteristic, as shown by the curve 42, whereby the picture carrier, at its intermediate frequency value, is supplied to the detector 34 free from the two carrier components of the I. F. signal. In practice, the bandpass characteristic of the amplifier 40 is made relatively narrow so as also to attenuate substantially all of the brightness information modulating the picture carrier, the narrowness of this bandwidth being limited principally by the frequency drift of the I. F. signal from its assigned value produced by variations of the frequency of the oscillator 12. In practice the bandwidth of amplifier 40 may be restricted to a value of the order of 500 kc./sec.

In a particularly desirable form, heterodyne detector 34 may consist of a multi-grid electron discharge tube 50 having a cathode 52, a first control grid 54, a screen grid 56, a second control grid 58 and an anode 60. The tube 50 may further include a suppressor grid 62 connected to the cathode 52. The grid 54 is supplied by the output of amplifier 30, whereas the grid 58 is energized by the picture carrier signal at the output of amplifier 40. The screen grid 56 is energized from a suitable source of positive potential (not shown) through a load impedance 64 and the anode 60 is energized from a source of positive potential (not shown) through a load impedance 66. By reason of the frequency heterodyning action produced by the tube 50, there will be generated, at the screen grid 56 and at the anode 60, signal currents having central frequency values equal to the differences between the picture carrier frequency and the frequencies of the color and sound carriers derived from the I. F. amplifier 30, i. e., there will be produced signal currents centered about a frequency of approximately 3.89 mc./sec. and a sound carrier centered at a frequency of 4.5 mc./sec. By constructing the load impedance 66 in the form of a filter having a pass band in the frequency range between about 3.4 mc./sec. and about 4.4 mc./sec., the color carrier at 3.89 mc./sec. and its sidebands may be preferentially selected and all other signal components generated at the anode 60 may be attenuated. Similarly, by constructing the load impedance 64 in the form of a filter having a pass band at approximately 4.5 mc./sec., the sound carrier and its sidebands may be preferentially selected and all other signal components generated at the screen grid 56 may be attenuated. It will be noted that any interaction products which may be produced between the detection components—i. e., a beat signal at approximately 600 kc./sec. representing the difference frequency between the two carriers applied to the tube 50—have frequency values different from those of the desired output signals of the detector system and are attenuated by the filters 64 and 66.

Since the picture carrier and the color and sound carriers supplied to the heterodyne detector 34 are derived from a single I. F. signal as produced by the mixer 10, it will be evident that these three components have a fixed frequency relationship irrespective of the actual frequency of the I. F. signal. Accordingly, misadjustment of the receiver due to improperly tuning the oscillator 12 or due to drifting of the oscilaltor frequency, does not produce corresponding changes in the frequency values of the signals derived from the detector 34 so that the frequency of the color carrier remains precisely at the value at which it was generated at the transmitter. Similarly, the frequency of the sound carrier derived from detector 34 has a frequency precisely equal to the difference between the frequencies of the picture carrier and sound carrier established at the transmitter. With reasonable care in the design of the I. F. amplifiers the phase correspondence between the picture carrier and the color carrier will be maintained so that the signal at the output of filter 66 will have the proper phase to establish correctly the chromaticity of the image elements.

Summarizing the television receiving system above described, it will be noted that the I. F. signal produced by the mixer 10—and comprising a picture carrier modulated by a wide band low frequency signal defining the brightness detail of the image elements to be reproduced and by a modulated color carrier arranged at one end of the spectrum of the brightness information and further comprising a sound carrier arranged beyond the spectrum of the color carrier—is supplied through a first restricted bandwidth system to a first detector system 24, by means of which the brightness information of the image is recovered to the exclusion of the color and sound carriers and without interfering components normally produced by the color and sound carriers. The I. F. signal is also supplied through a second restricted bandwidth system to a second detector system 34 by means of which color and sound carriers are recovered to the exclusion of the image brightness signal. Furthermore, since the detector system 34 is a heterodyne type detector which is actuated by a heterodyning signal having a frequency of fixed difference value relative to the sound and color carriers appearing in the I. F. signal, the detection products thereof exhibit central frequency values as precisely established at the transmitter. It will be noted also that, since the attenuation of various components of the I. F. signal is controlled by means of the bandwidth characteristics of amplifier 22 and detector 24 in one instance and by the color I. F. amplifier 30 in the second instance, a considerable simplification of the bandwidth characteristics of amplifiers 16 and 18 may be realized so that these amplifiers may be made with a symmetrical transmission characteristic, as shown, without sacrificing the selectivity of the receiver against signals of adjacent channels in the tuning range of the receiver.

The signals produced at the outputs of detector 24 and detector 34 may be applied to a color image reproducing system and a sound reproducing system in well known manner, and a further description of a system for so doing is believed to be unnecessary.

Figure 2:
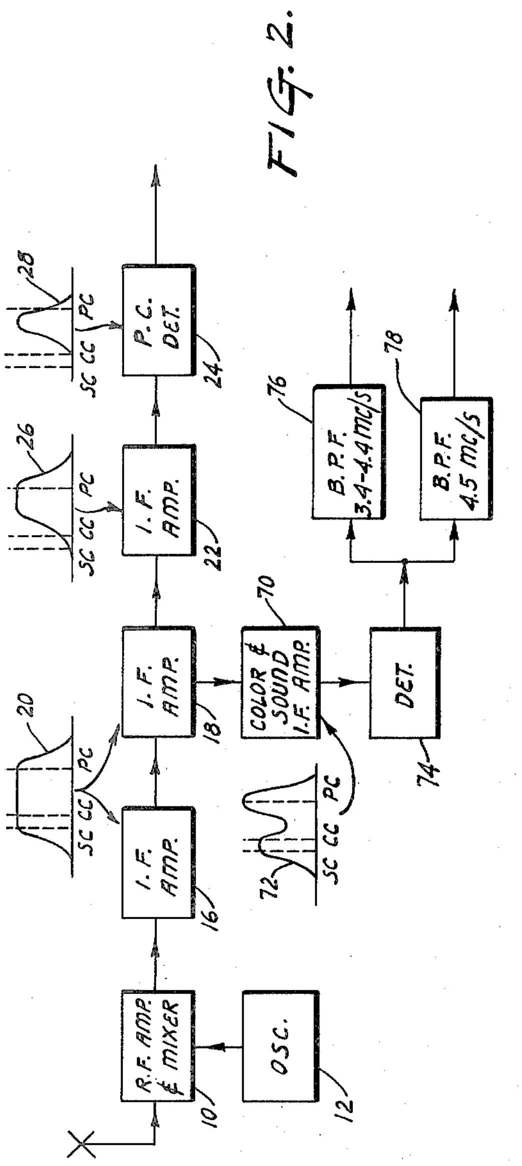
Figure 2 is a block diagram showing another form of a receiving system in accordance with the invention.

In the arrangement shown in Figure 1 the picture carrier, serving as the heterodyning signal for producing the desired color and sound carriers, is derived from the I. F. signal by means of a separate bandpass network—i. e. the amplifier 40. Alternatively, the picture carrier may be derived by the same network used for deriving the color and sound carrier at their I. F. frequencies. More particularly, and as shown in Figure 2, the picture carrier and the color and sound carriers are derived from the I. F. system of the receiver by means of a bandpass amplifier 70 having a transmission characteristic of the form shown by the curve 72, by means of which signal components having frequencies in the vicinity of the I. F. picture carier and the I. F. color and sound carriers are transmitted substantially unattenuated while other components are attentuated.

The output of amplifier 70 energizes a detector 74 which may be a diode detector. The detector 74 produces a first output signal consisting of the heterodyne beat between the I. F. picture carrier and the I. F. color carrier, and a second output signal consisting of the heterodyne beat between the I. F. picture carrier and the I. F. sound carrier. These output signals may be selectively derived from the detector 74 by means of simple filters 76 and 78 which further serve to attenuate any other interaction products produced by the detector 74, such as the beat signal at approximately 600 kc./sec. representing the difference frequency between the I. F. color and sound carriers.

The remaining portions of the system of Figure 2 are similar to those of the system shown in Figure 1 and similar numerals have been used to identify the corresponding portions.

Figure 3:
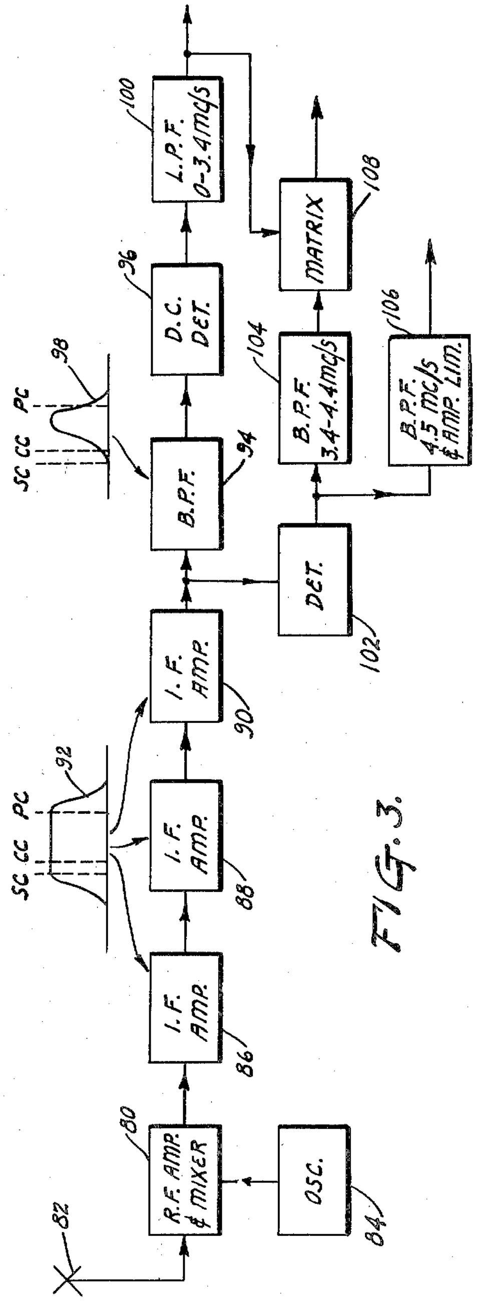
Figure 3 is a block diagram illustrating a further embodiment of the invention.

Figure 3 illustrates a further simplification of the system of the invention. The receiver there shown comprises a radio frequency amplifier and mixer 80 coupled to an antenna system 82, an oscillator 84 coupled to the mixer 80, and I. F. amplifiers 86, 88 and 90 connected in cascade to the output of mixer 80. The amplifiers 86, 88 and 90 may have bandpass characteristics as shown at 92, whereby the intermediate frequency picture, color and sound carriers, and their associated sideband components, are transmitted unattenuated. The amplifier 90 supplies a first channel from which the brightness detail of the image elements is derived without contamination from the color and sound carriers. This brightness signal channel comprises a bandpass filter 94 and a picture carrier detector 96 the latter of which may be a diode detector as previously described in connection with the detector 24 of the system of Figure 1.

In order to prevent the output of the detector 96 from being contaminated by spurious signals falling within the frequency spectrum of the brightness information, bandpass filter 94 has a transmission characteristic as shown by the curve 98 by means of which the I. F. color and sound carriers are substantially prevented from reaching the detector 96. A low pass filter 100, having a transmission spectrum limited to that of the brightness signal, may be coupled to the output of detector 96 as shown.

The I. F. amplifier further supplies a second channel from which the color carrier and the sound carrier are derived. This second channel comprises a detector 102 which may be a diode detector and which serves to produce a first heterodyne signal at a nominal frequency of 3.89 mc./sec., representing the difference between the frequencies of the I. F. picture and color carriers, and a second heterodyne signal at a nominal frequency of 4.5 mc./sec. representing the difference between the frequencies of the I. F. picture and sound carriers. These heterodyne signals may be separated into individual paths by means of bandpass filters 104 and 106 each adapted to attenuate signal components having frequency values different from those of the desired output signals.

It will be noted that, in this modification of the invention, substantially the entire I. F. signal is supplied to the detector 102. In some instances, under this condition, the amplitude modulation accompanying the I. F. picture carrier, i. e. the brightness information, may amplitude modulate the desired output signals of the detector 102. The effects thereof may be avoided in the case of the detected color carrier derived from bandpass filter 105 by using a matrixing network 108 coupled to filter 104 and filter 100 and adapted to combine appropriate quantities of the brightness signal with the color carrier to cancel the undesired amplitude modulations of the color carrier. Such a matrixing network may consist, for example, of two discharge tubes having individual input circuits, supplied by the filters 100 and 104, and a common output circuit. By adjusting the level of the signal applied from the filter 100, amplitude variations of the signal from filter 104 may be compensated to the desired degree.

Undesired amplitude modulation impressed on the sound carrier may be cancelled by an amplitude limiter of well known form contained within the bandpass filter system 106.

From the foregoing, it will be seen that the invention provides a novel system for detecting the three image and sound defining components of a received color television signal without producing interaction products of the components which would deleteriously affect the desired information. Furthermore, by means of the system of the invention, the signal components are each detected at a high signal level so that the recovered information exhibits large amplitude values which make it unnecessary to further amplify the same to the extent heretofore required in prior art detecting systems.

In each of the aforedescribed embodiments of my invention precautions have been taken to eliminate entirely both the chroma and sound carriers from the signal which is applied to the picture carrier detector. Such complete elimination naturally precludes the possibility that the detected picture carrier modulation components will be contaminated with undesired components created by interaction between the other two carriers in the picture carrier detector. It will be understood, however, that such complete elimination is not essential to the successful practice of my invention. Instead the perturbations, which are caused in the reproduced image by the presence of the aforementioned undesired components, can be reduced below the level at which they become objectionable merely by sufficiently attenuating one of the two carriers with respect to the other. When this is done, the heterodyne components produced by interaction of these carriers will also become so small as to produce only imperceptible perturbations in the reproduced image.

While I have described my invention by means of specific examples and in a specific embodiment, I do not wish to be limited thereto for obvious modifications will occur to those skilled in the art without departing from the scope of the invention.

I claim:

1. A receiving system for a composite signal comprising a first intelligence component in the form of a first modulated carrier wave having a first given frequency value and having a frequency spectrum extending to a given maximum frequency value, a second intelligence component in the form of a second modulated carrier wave having a second given frequency value and having a frequency spectrum arranged at one end of the frequency spectrum of said first intelligence component, and a third intelligence component in the form of a third modulated carrier wave having a third given frequency value and having a frequency spectrum arranged adjacent to the frequency spectrum of said second carrier wave at the end thereof remote from the frequency spectrum of said first carrier wave, said receiving system comprising: detector means responsive to the application of signals to produce heterodyne components of said applied signals at said output terminals; means for applying to said detector means a signal derived from said first carrier wave and having said first given frequency value; means for applying to said detector means said second and third carrier waves; and means for selectively deriving from said detector means heterodyne components of said signal having said first frequency value and said second carrier wave and heterodyne components of said signal having said first frequency value and said third carrier wave.

2. A receiving system for a composite signal comprising a first intelligence component in the form of a first modulated carrier wave having a first given frequency value and having a frequency spectrum extending to a given maximum frequency value, a second intelligence component in the form of a second modulated carrier wave having a second given frequency value and having a frequency spectrum arranged at one end of the frequency spectrum of said first intelligence component, and a third intelligence component in the form of a third modulated carrier wave having a third given frequency value and having a frequency spectrum arranged adjacent to the frequency spectrum of said second carrier wave at the end thereof remote from the frequency spectrum of said first carrier wave, said receiving means comprising an input signal path for said composite signal, first channel means coupled to said input path, said channel means having a bandpass characteristic adapted to transmit at least said first modulated carrier wave, first detector means, means for applying to said detector means said first carrier wave transmitted by said first channel means thereby to produce at the output of said detector means a first output signal representative of said first intelligence component, second channel means separate from said first channel means coupled to said input path and having a band pass characteristic adapted to transmit at least said second and third modulated carrier waves, second detector means for detecting the modulation of said second and third carrier waves, and means for applying to said second detector means said second and third carrier waves transmitted by said second channel means.

3. A receiving system for a composite signal comprising a first intelligence component in the form of a first modulated carrier wave having a first given frequency value and having a frequency spectrum extending to a given maximum frequency value, a second intelligence component in the form of a second modulated carrier wave having a second given frequency value and having a frequency spectrum arranged at one end of the frequency spectrum of said first intelligence component, and a third intelligence component in the form of a third modulated carrier wave having a third given frequency value and having a frequency spectrum arranged adjacent to the frequency spectrum of said second carrier wave at the end thereof remote from the frequency spectrum of said first carrier wave, said receiving system comprising an input signal path for said composite signal, first channel means coupled to said input path, said channel means having a bandpass characteristic adapted to transmit at least said first modulated carrier wave, first detector means, means for applying to said detector means said first carrier wave transmitted by said channel means thereby to produce at the output of said detector means a first output signal representative of said first intelligence component, second channel means separate from said first channel means coupled to said input path and having a bandpass characteristic adapted to transmit said second and third modulated carrier waves, second detector means, and means for applying to said second detector means said second and third carrier waves transmitted by said second channel means and a signal having a frequency equal to said first frequency value thereby to produce at the output of said second detector means second and third output signals, said second output signal being representative of said second intelligence component and being in the form of a modulated wave having a frequency equal to the difference between said first and second frequency values, and said third output signal being representative of said third intelligence component and being in the form of a modulated wave having a frequency equal to the difference between said first and third frequency values.

4. A receiving system for a composite signal comprising a first intelligence component in the form of a first modulated carrier wave having a first given frequency value and having a frequency spectrum extending to a given maximum frequency value, a second intelligence component in the form of a second modulated carrier wave having a second given frequency value and having a frequency spectrum arranged at one end of the frequency spectrum of said first intelligence component, and a third intelligence component in the form of a third modulated carrier wave having a third given frequency value and having a frequency spectrum arranged adjacent to the frequency spectrum of said second carrier wave at the end thereof remote from the frequency spectrum of said first carrier wave, said receiving system comprising an input signal path for said composite signal, first channel means coupled to said input path, said channel means having a bandpass characteristic adapted to transmit said first modulated carrier wave to the exclusion of said second and third modulated carrier waves, first detector means, means for applying to said detector means said first carrier wave transmitted by said channel means thereby to produce at the output of said detector means a first output signal representative of said first intelligence component, second channel means coupled to said input path and having a bandpass characteristic adapted to transmit said second and third modulated carrier waves, second detecting means, and means for applying to said second detector means said second and third carrier waves transmitted by said second channel means and a signal having a frequency equal to said first frequency value thereby to produce at the output of said second detector means second and third output signals, said second output signal being representative of said second intelligence component and being in the form of a modulated wave having a frequency equal to the difference between said first and second frequency values, and said third output signal being representative of said third intelligence component and being in the form of a modulated wave having a frequency equal to the difference between said first and third frequency values.

5. A receiving system as claimed in claim 4 further comprising a transmission path coupled to said second detecting means, said transmission path having a bandpass characteristic adapted to attenuate signal components having frequency values equal to the algebraic sum of the frequencies of said second and third output signals.

6. A receiving system as claimed in claim 5 wherein said transmission path comprises third and fourth channel means coupled to said second detecting means for selectively transmitting said second and third output signals to different utilization circuits.

7. A receiving system as claimed in claim 4 wherein said first channel means has a bandpass characteristic adapted partially to attenuate said first carrier wave.

8. A receiving system as claimed in claim 4 wherein said first channel means comprises a first transmission path having a bandpass characteristic adapted to attenuate said second and third modulated carrier waves and a second transmission path having a bandpass characteristic adapted to attenuate said second and third modulated carrier waves and to attenuate partially said first carrier wave.

9. A receiving system as claimed in claim 4 wherein said signal having a frequency equal to said first frequency value is derived from said first intelligence component and wherein the deriving means for said signal comprises a transmission path coupled to said first channel means and adapted to transmit to said second detecting means said first carrier wave substantially to the exclusion of modulation component thereof.

10. A receiving system as claimed in claim 4 wherein said second channel means transmitting said second and third carrier waves comprises means for attenuating the modulation components of said first carrier wave.

11. A receiving system as claimed in claim 4 wherein said second channel means transmitting said second and third carier waves comprises means for attenuating said first modulated carrier wave, and wherein said means for applying to said second detector means a signal having a frequency equal to said first frequency value comprises a transmission path coupled to said first channel means and adapted to transmit to said second detecting means said first carrier wave substantially to the exclusion of modulation components thereof.

12. A receiving system as claimed in claim 4 wherein said second detecting means comprises a heterodyne detector system having input circuits energized by said second and third carrier waves and by said signal having a frequency equal to said first frequency value and having output circuits adapted to transmit selectively said second and third output signals to the exclusion of other signal components produced by said heterodyne detector system.

13. A receiving system as claimed in claim 10 wherein said second channel means transmitting said second and third carrier means comprises means for transmitting said first carrier wave.

14. A receiving system as claimed in claim 12 further comprising means for combining algebraically said first output signal and said second output signal.

15. A receiving system for producing a color television image defined by a composite signal comprising a first carrier wave having a first given frequency value, said carrier wave being amplitude modulated by a first intelligence signal indicative of the brightness detail of the elements of said image, and having a first frequency spectrum extending to a given maximum frequency value, a second carrier wave having a second given frequency value and a second frequency spectrum arranged at one end of said first frequency spectrum, and a third carrier wave having a third given frequency value and a third frequency spectrum arranged adjacent to said second frequency spectrum at the end thereof remote from said first frequency spectrum, said second carrier wave having amplitude and phase variations establishing with said first intelligence signal the chromaticity of the elements of said image and said third carrier wave having variations indicative of aural intelligence accompanying said color television image, said receiving system comprising an input signal path for said composite signal, first channel means coupled to said input path, said channel means having a bandpass characteristic adapted to transmit said first modulated carrier wave to the exclusion of said second and third modulated carrier waves, first detector means, means for applying to said detector means said first carrier wave transmitted by said first channel means thereby to produce at the output of said detector means a first output signal having variations indicative of the brightness detail of the elements of said image, second channel means coupled to said input path and having a bandpass characteristic adapted to transmit said second and third modulated carrier waves, second detector means, and means for applying to said second and third modulated carrier waves transmitted by said second channel means and a signal having a frequency equal to said first frequency value thereby to produce at the output of said second detector means second and third output signals, said second output signal being in the form of a modulated wave having a frequency equal to the difference between said first and second frequency values and defining with said first output signal the chromaticity of said image elements, and said third output signal being in the form of a modulated wave having a frequency equal to the difference between said first and third frequency values and defining the aural intelligence accompanying said image.

16. A color television system as claimed in claim 15 wherein said second and third output signals have frequency values, the sum and difference of which fall outside the frequency spectra of said second and third output signals.

17. A receiving system for producing a color television image defined by a composite signal comprising a first carrier wave having a first given frequency value, said carrier wave being amplitude modulated by a first intelligence signal indicative of the brightness detail of the elements of said image, and having a first frequency spectrum extending to a given maximum frequency value, a second carrier wave having a second given frequency value and a second frequency spectrum arranged adjacent to said maximum frequency value and a third carrier wave having a third given frequency value and a third frequency spectrum arranged adjacent to said second frequency spectrum at the end thereof remote from said first frequency spectrum, said second carrier wave having amplitude and phase variations establishing with said first intelligence signal the chromaticity of the elements of said image and said third carrier wave having variations indicative of aural intelligence accompanying said color television image, said receiving system comprising a first transmission path for amplifying the said composite signal, a second transmission path coupled to said first transmission path and adapted to amplify signal components within said first frequency spectrum selectively with respect to signal components within said second and third frequency spectra, a third transmission path coupled to said second transmission path and adapted to attenuate partially signal components at said first given frequency value with respect to signal components within said first frequency spectrum, said third transmission path comprising signal detecting means for producing a first output signal having variations determined by said first intelligence signal and indicative of brightness variations of the said image elements, a fourth transmission path coupled to said first transmission path and adapted to amplify signal components within said second and third frequency spectra selectively with respect to signal components within said first frequency spectrum, a fifth transmission path coupled to said second transmission path and having a bandpass characteristic adapted to transmit said first carrier wave selectively with respect to signal components within said first, second and third spectra, a heterodyne detector system, said heterodyne detector system being coupled to said fourth and fifth transmission paths and being adapted thereby to produce second and third output signals, said second output signal being in the form of a modulated wave having a frequency equal to the difference between said first and second frequency values and defining with said first output signal the chromaticity of said image elements, and said third output signal being in the form of a modulated wave having a frequency equal to the difference between said first and third frequency values and defining the aural intelligence accompanying said image, and transmission paths coupled to said heterodyning detecting means, said last mentioned transmission paths having bandpass characteristics centered about the said difference frequency values of said second and third output signals and each adapted to transmit selectively a different one of said second and third output signals.

18. A receiving system for producing a color television image defined by a composite signal comprising a first carrier wave having a first given frequency value, said carrier wave being amplitude modulated by a first intelligence signal indicative of the brightness detail of the elements of said image and having a first frequency spectrum extending to a given maximum frequency value, a second carrier wave having a second given frequency value and a second frequency spectrum arranged adjacent to said maximum frequency value and a third carrier wave having a third given frequency value and a third frequency spectrum arranged adjacent to said second frequency spectrum at the end thereof remote from said first frequency spectrum, said second carrier wave having amplitude and phase variations establishing with said first intelligence signal the chromaticity of the elements of said image and said third carrier wave having variations indicative of aural intelligence accompanying said color television image, said receiving system comprising a first transmission path for amplifying the said composite signal, a second transmission path coupled to said first transmission path and adapted to amplify signal components within said first frequency spectrum selectively with respect to signal components within said second and third frequency spectra, said second transmission path comprising first detecting means for producing a first output signal having variations determined by said first intelligence signal and indicative of brightness variations of said image elements, a third transmission path coupled to said first transmission path and adapted to amplify signal components within said second and third frequency spectra and at the frequency of said first carrier wave selectively with respect to modulation components of said first carrier wave, second detecting means, said second detecting means being coupled to said third transmission path and being adapted to thereby produce second and third output signals, said second output signal being in the form of a modulated wave having a frequency equal to the difference between said first and second frequency values and defining with said first output signal the chromaticity of said image elements, and said third output signal being in the form of a modulated wave having a frequency equal to the difference between said first and third frequency values and defining the aural intelligence accompanying said image, and fourth and fifth transmission paths coupled to said second detecting means, said last mentioned transmission paths having bandpass characteristics centered about the said difference frequency values of said second and third output signals and each adapted to transmit selectively a different one of said second and third output signals.

19. A receiving system for producing a color television image defined by a composite signal comprising a first carrier wave having a first given frequency value, said carrier wave being amplitude modulated by a first intelligence signal indicative of the brightness detail of the elements of said image and having a first frequency spectrum extending to a given maximum frequency value, a second carrier wave having a second given frequency value and a second frequency spectrum arranged adjacent to said maximum frequency value and a third carrier wave having a third given frequency value and a third frequency spectrum arranged adjacent to said second frequency spectrum at the end thereof remote from said first frequency spectrum, said second carrier wave having amplitude and phase variations establishing with said first intelligence signal the chromaticity of the elements of said image and said third carrier wave having variations indicative of aural intelligence accompanying said color television image, said receiving system comprising a first transmission path for amplifying the said composite signal, a second transmission path coupled to said first transmission path and adapted to transmit signal components within said first frequency spectrum selectively with respect to signal components within said second and third frequency spectra, first detecting means coupled to said second transmission path for producing a first output signal having variations determined by said first intelligence signal and indicative of brightness variations of the said image elements, second detecting means, said second detecting means being coupled to said first transmission path and being adapted thereby to produce heterodyne frequency products of said first, second and third frequency spectra, third and fourth transmission paths coupled to said second detecting means, said third transmission path having a bandpass characteristic adapted to derive from the said heterodyne products produced by said second detecting means a second output signal in the form of a modulated wave having a frequency equal to the difference between said first and second frequency values, and said fourth transmission path having a bandpass characteristic adapted to derive from the said heterodyne products produced by said second detecting means a third output signal in the form of a modulated wave having a frequency equal to the difference between said first and third frequency values, means for algebraically combining said first and second output signals to produce a wave defining with said first output signal the chromaticity of said image elements, and means to limit the amplitude of said third output signal to produce a wave defining the aural intelligence accompanying said image.

References Cited in the file of this patent

UNITED STATES PATENTS

| | | |
|---|---|---|
| 2,335,180 | Goldsmith | Nov. 23, 1945 |
| 2,558,351 | Fredendall | June 26, 1951 |